United States Patent
Tokioka

(10) Patent No.: US 7,434,839 B2
(45) Date of Patent: Oct. 14, 2008

(54) COLLAPSIBLE STEERING APPARATUS

(75) Inventor: Ryoichi Tokioka, Yamatokoriyama (JP)

(73) Assignee: JTEKT Corporation, Osaka (JP)

( * ) Notice: Subject to any disclaimer, the term of this patent is extended or adjusted under 35 U.S.C. 154(b) by 476 days.

(21) Appl. No.: 11/136,715

(22) Filed: May 25, 2005

(65) Prior Publication Data

US 2005/0263997 A1    Dec. 1, 2005

(30) Foreign Application Priority Data

May 27, 2004    (JP)    ............................. 2004-158262

(51) Int. Cl.
*B62D 1/11*    (2006.01)
(52) U.S. Cl. ..................................................... 280/777
(58) Field of Classification Search ................. 280/777; 74/492, 493
See application file for complete search history.

(56) References Cited

U.S. PATENT DOCUMENTS 5,547,221 A    8/1996    Tomaru et al.
5,755,461 A *  5/1998   Halacka et al. ............. 280/777
6,378,903 B1   4/2002   Yabutsuka et al.

FOREIGN PATENT DOCUMENTS

| EP | 1 057 713 A2 | 12/2000 |
| EP | 1 057 713 A3 | 2/2005 |
| JP | 10-129504 | 5/1998 |

\* cited by examiner

*Primary Examiner*—Eric Culbreth
(74) *Attorney, Agent, or Firm*—Rabin & Berdo, PC

(57) ABSTRACT

There is provided a collapsible steering apparatus, which includes a steering column having a movable part capable of moving upon collision of a vehicle. The main part of a bracket is fixed to the movable part. Extended pieces are extended from the main part, and each extended piece is folded back into a U shape to superimpose the extension end of the bent extended piece on the main part. A fixing member is inserted into each insertion hole of the main part and of the extension end of the extended piece, and is fixed to a vehicle body member. As a result, the extension end is fixed to the vehicle body member. The insertion hole of the main part includes an open part for allowing the fixing member to come off upon collision. Upon collision, the main part of the bracket and the base end of the extended piece move along with the movable part. As a result, the base end and the extension end of the extended piece move relative to each other to deform the extended piece to absorb the impact of the collision.

12 Claims, 17 Drawing Sheets

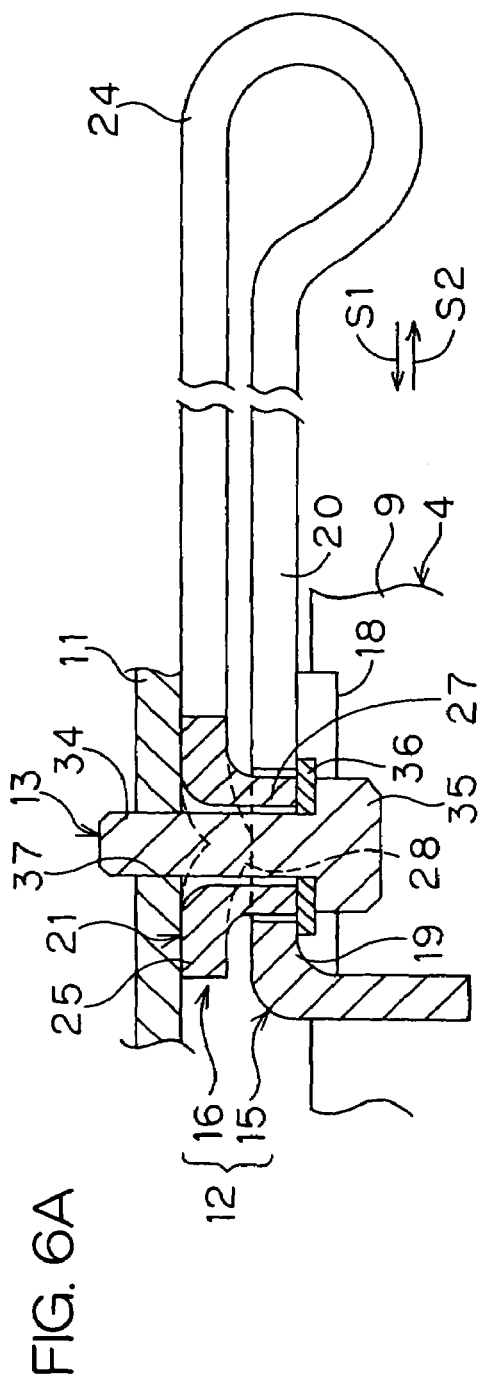

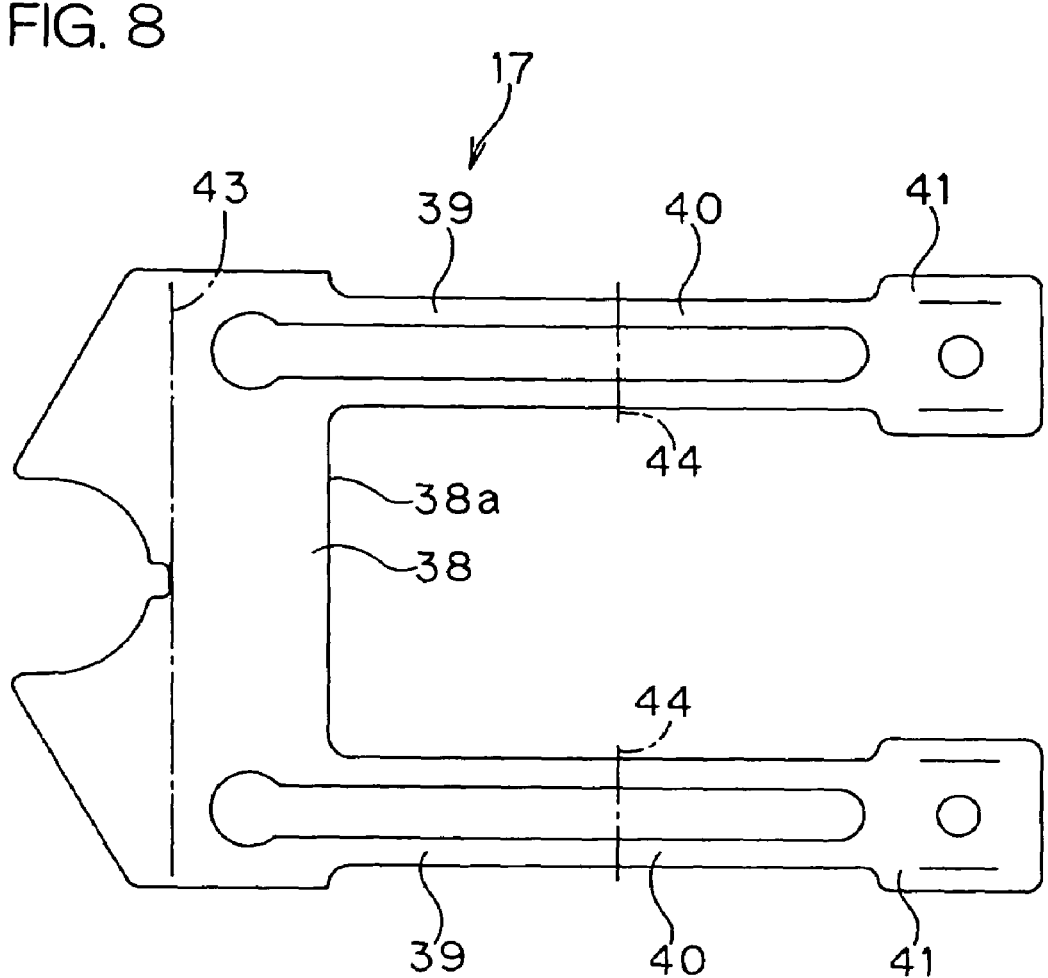

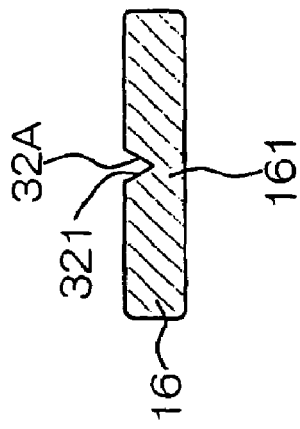
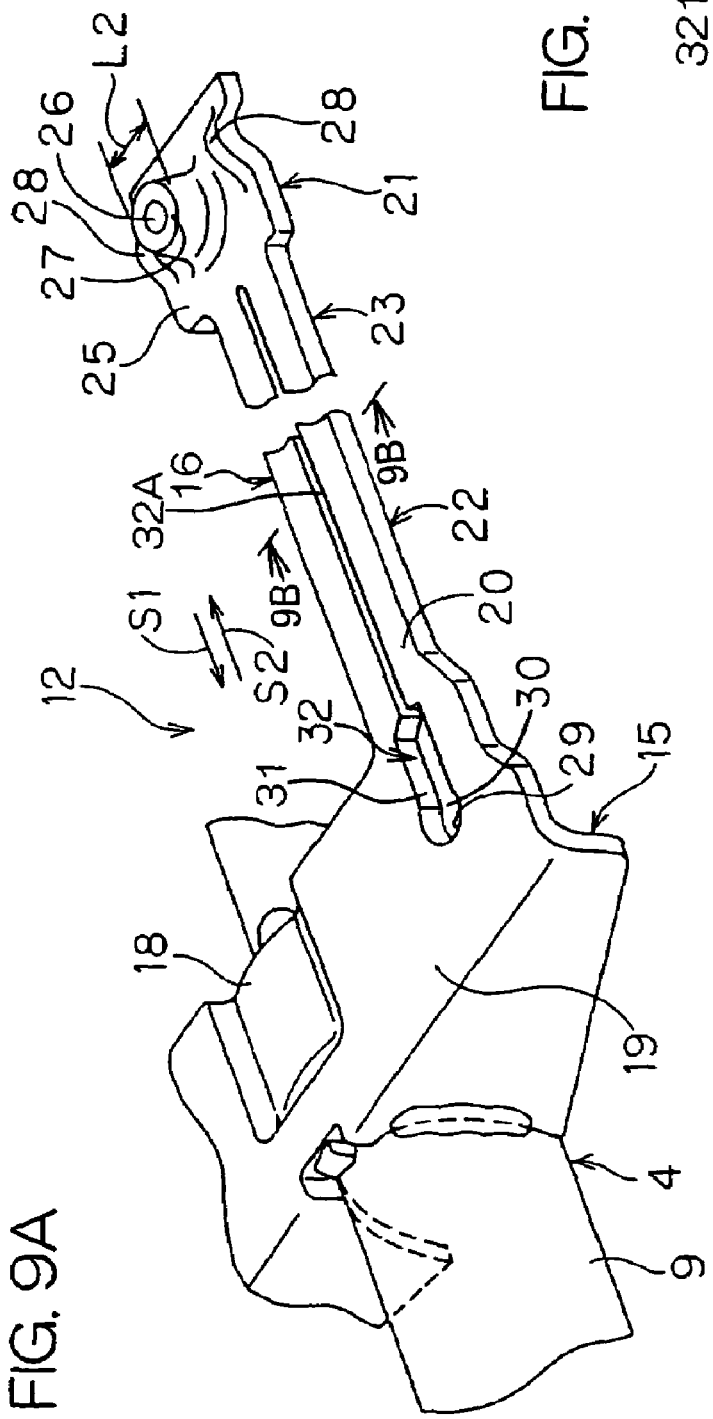

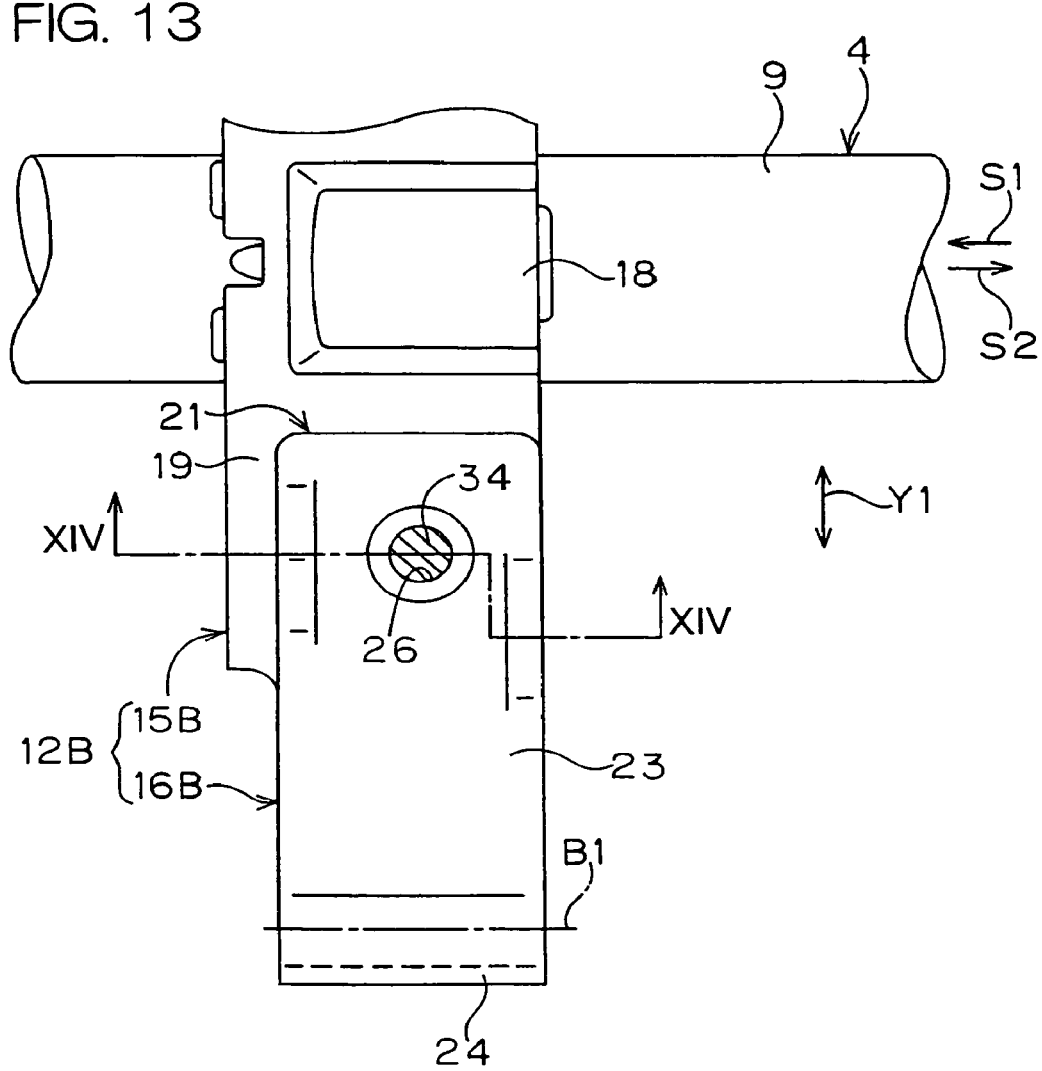

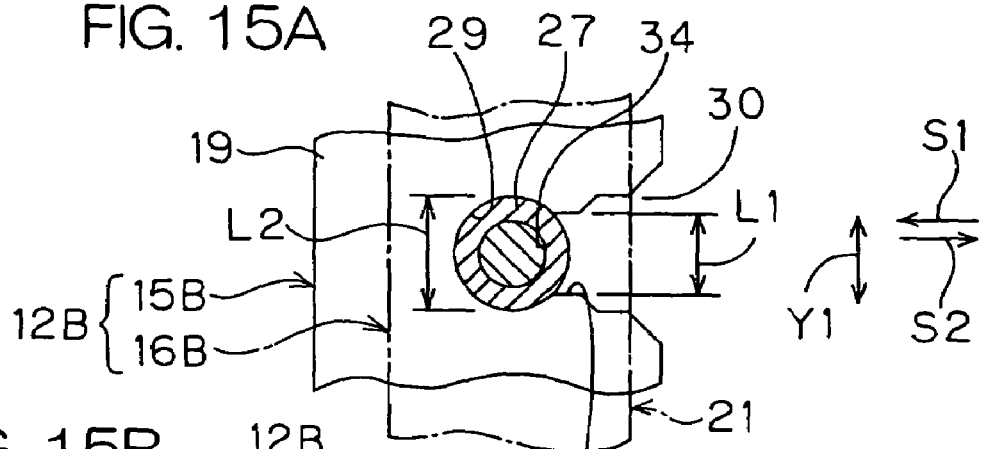
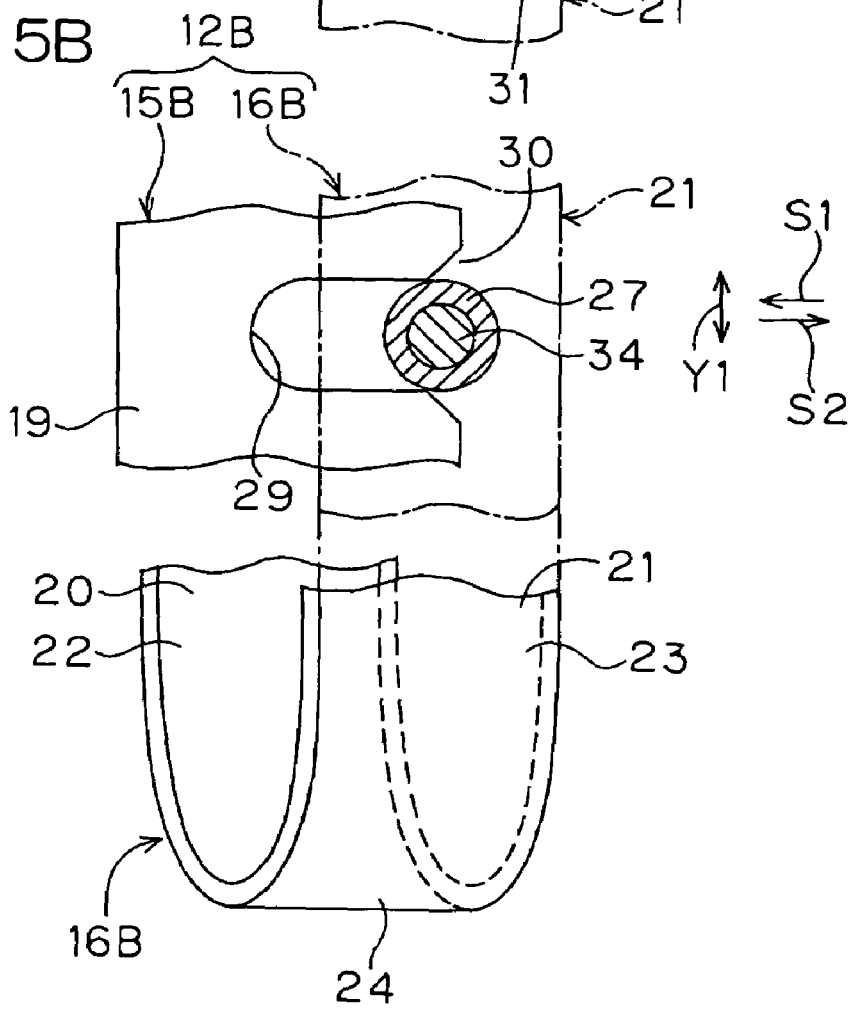
FIG. 15A
FIG. 15B

COLLAPSIBLE STEERING APPARATUS

BACKGROUND OF THE INVENTION

1. Field of the Invention

This invention relates to a collapsible steering apparatus for a vehicle or the like.

2. Description of Related Art

Among steering apparatuses, a collapsible steering apparatus capable of absorbing impact energy generated by a collision of vehicles is widely known.

An example of such a collapsible steering apparatus is disclosed in Japanese Unexamined Patent Publication No. 10-129504 (1998). The disclosed steering apparatus has a steering column that is supported to be movable relative to the vehicle body member upon colliding. A column bracket fixed to the steering column, a fixed bracket that is formed separately from the column bracket and is fixed to a vehicle body member to support the column bracket to be movable, and a fixing bolt for fixing the fixed bracket to the vehicle body member are provided to the steering apparatus.

The above steering apparatus, however, tends to require an increased number of components because the column bracket and the fixed bracket are formed separately to make the column bracket move relative to the fixed bracket. This makes mounting the components difficult.

In order to solve the above problem, the purpose of this invention is to provide a collapsible steering apparatus that can reduce the number of components.

SUMMARY OF THE INVENTION

The collapsible steering apparatus in a preferred aspect of the present invention has a steering column that includes a movable part capable of moving upon collision of a vehicle, a bracket that is made of a single sheet metal and is fixed to the movable part of the steering column, and a fixing member for fixing the movable part of the steering column to a vehicle body member via the bracket. The bracket includes a main part, and an extended piece, which is extended from the main part and is folded back into a U shape. The extended piece includes a base end connected to the main part, and an extension end superimposed on the main part by the folding. The main part and the extension end of the extended piece include respective insertion holes communicating with each other. The fixing member is inserted through respective insertion holes of the main part and the extension end, and is adapted to be fixed to the vehicle body member to fix the extension end to the vehicle body member. The insertion hole of the main part includes an open part, which is adapted to allow the fixing member to come off from the insertion hole of the main part upon the collision. Upon the collision, as the main part of the bracket and the base end of the extended piece are adapted to move along with the movable part of the steering column, at which the base end and the extension end of the extended piece move relative to each other, causing the extended piece to deform to absorb a shock of collision.

According to the aspect of the invention, therefore, the extended piece deforms to absorb the impact as the main part of the bracket and the base end of the extended piece move together with the movable part of the steering column when a collision occurs. The main part fixed to the movable part of the steering column and the extension end of the extended piece fixed to the vehicle body member are formed integrally from a single member. This reduces the number of components to lessen trouble of mounting the components. Moreover, since the bracket is made of a single sheet metal, the manufacturing cost of the bracket is also reduced.

BRIEF DESCRIPTION OF THE DRAWINGS

FIG. 1A shows the steering apparatus in a normal state while FIG. 1B shows the same at the time of impact absorption;

FIGS. 6A and 6B are partial sectional side views that depict the profile along a VI-VI line of the upper bracket or the like shown in FIG. 4, where FIG. 6A shows the upper bracket in a normal state while FIG. 6B shows the same at a time of impact absorption;

FIG. 7A shows the upper bracket in the normal state while FIG. 7B shows the same at the time of impact absorption;

FIG. 8 is a top view of the exploded plate corresponding to the upper bracket shown in FIG. 2;

FIG. 9A is a perspective view of the upper bracket or the like corresponding to FIG. 3, depicting a modification of a guide groove;

FIG. 9B is a sectional view that depicts the profile along the 9B-9B line shown in FIG. 9A;

FIG. 13 is a partial sectional top view of the upper bracket or the like shown in FIG. 11;

FIG. 14A shows the upper bracket in the normal state while FIG. 14B shows the same at the time of impact absorption;

FIGS. 15A and 15B are partial sectional top views of the upper bracket or the like shown in FIG. 11, where FIG. 15A shows the upper bracket in the normal state while FIG. 15B shows the same at the time of impact absorption;

DETAILED DESCRIPTION OF THE PREFERRED EMBODIMENT

Figure 1A:
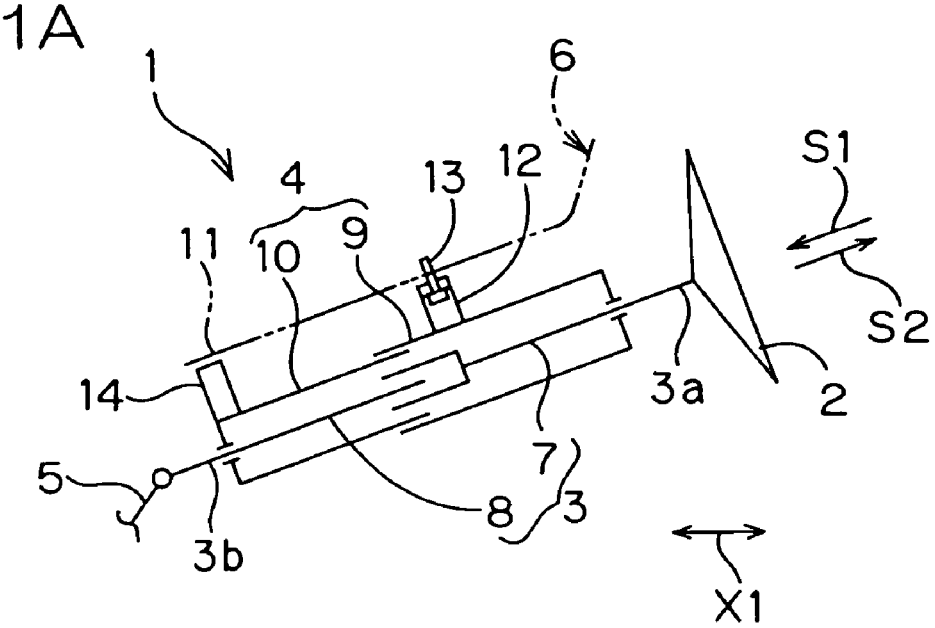
FIGS. 1A and 1B are simplified views of the outline structure of the collapsible steering apparatus according to a first embodiment of the invention, where

The following is a detailed description of the preferred embodiments of the invention, with reference to the attached drawings. FIG. 1A is the simplified view of the outline structure of the collapsible steering apparatus according to the first embodiment of the invention.

The collapsible steering apparatus 1 shown in FIG. 1A has a steering shaft 3, which transmits a steering torque applied to a steering wheel 2 for operating wheels (not shown), and a steering column 4, in which the steering shaft 3 is inserted and supported rotatably. The steering shaft 3 has one end 3a, to which the steering wheel 2 is connected, and another end 3b, to which a steering mechanism (not shown) for operating the wheels is connected via an intermediate shaft 5 or the like. When the steering wheel 2 is operated, the steering torque from the steering wheel 2 is transmitted to the steering mechanism via the steering shaft 3 or the like to operate the wheels.

The collapsible steering apparatus 1 is supported on a vehicle body 6 in such a way that the axial directions S1 and S2 of the steering shaft 3 are diagonal to the longitudinal direction X1 of the vehicle, with the steering wheel 2 arranged to be on the upside, for example. The steering wheel 2 is movable relative to the vehicle body 6 (partially shown) upon a collision (see FIG. 1B) so as to absorb impact energy generated by the collision.

The steering shaft 3 comprises of an upper shaft 7, whose one end is connected to the steering wheel 2, and a lower shaft 8, which is coupled to the upper shaft 7 via a coupling structure. The coupling structure is, for example, a spline structure that couples the other end of the upper shaft 7 to one end of the lower shaft 8 so that both shafts can move relative to each other along the axial directions S1 and S2 of the steering shaft 3 and rotate together.

The steering column 4 has an upper tube 9 which is a movable part that can move relative to the vehicle body 6 at the time of collision, and a lower tube 10 which is a fixed part that is prevented from moving relative to the vehicle body 6 at the time of collision.

The upper tube 9 houses a part of the upper shaft 7, and restricts the relative movement of the upper shaft 7 in its axial direction via a bearing (not shown) mounted on the upper tube 9. The lower tube 10 houses a part of the lower shaft 8, and restricts the relative movement of the lower shaft 8 in its axial direction via a bearing (not shown) mounted on the lower tube 10. The outer periphery of the upside end in the axial direction of the lower tube 10 is fitted on the inner periphery of the downside end in the axial direction of the upper tube 9 to allow both tubes 9 and 10 to slide over relative to each other in respective axial directions S1 and S2.

The collapsible steering apparatus 1 has an upper bracket 12 which is a bracket that is fixed to the upper tube 9 to support it on a vehicle body member 11, and fixing members 13 for mounting the upper tube 9 on the vehicle body member 11 via the upper bracket 12. The collapsible steering apparatus 1 also includes a lower bracket 14, which is fixed to the lower tube 10 and to the vehicle body member 11 to support the lower tube 10 on the vehicle body member 11.

The vehicle body member 11 is arranged on the vehicle body 6, and is a member on which the collapsible steering apparatus 1 is mounted. The vehicle body member 11 may be formed separately from the vehicle body 6 and fixed to the vehicle body 6, or may be formed integrally with the vehicle body 6. According to this embodiment, the upper bracket 12 is mounted on the lower side of the vehicle body member 11.

Figure 2:
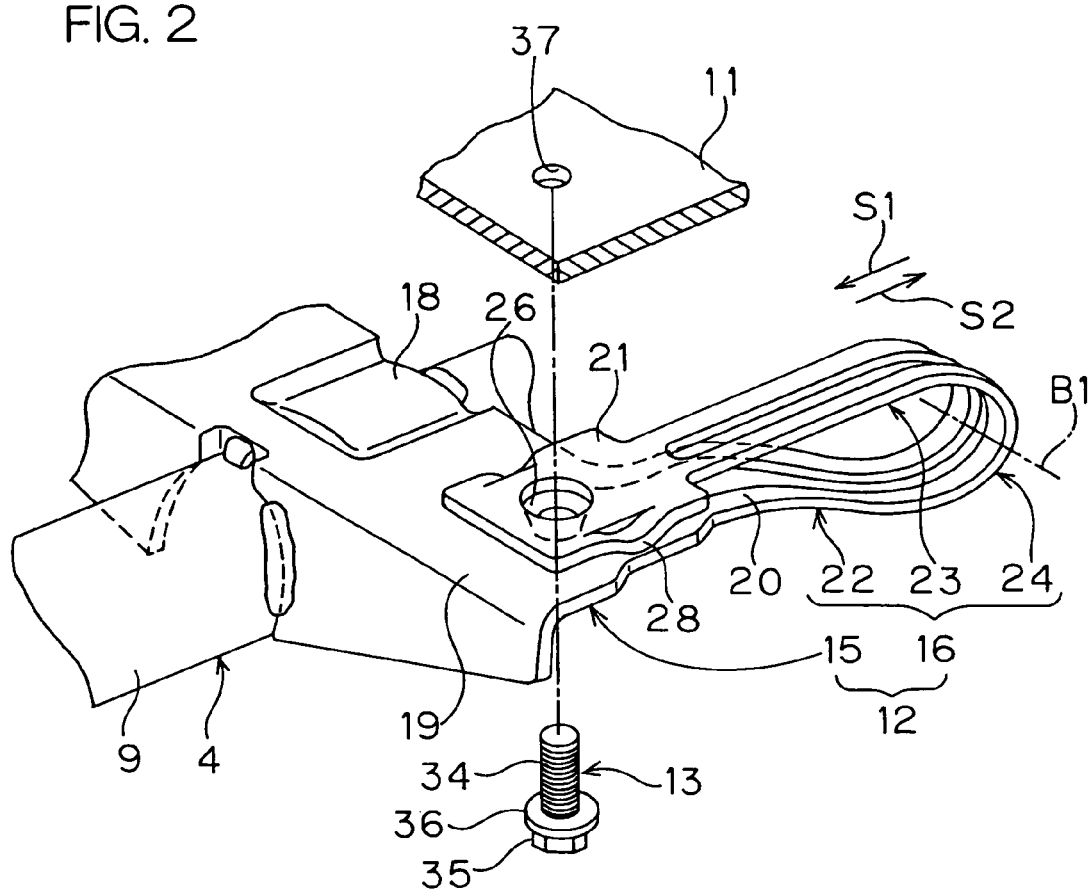
FIG. 2 is an exploded perspective view of an upper bracket or the like shown in FIG. 1.

As shown in FIG. 2, according to the embodiment, the upper bracket 12 includes a main part 15, and a plurality of extended pieces, for example, two extended pieces 16 (only one piece is shown) each of which is extended from the main part 15 and is folded back into a U shape. The upper bracket 12 is formed to be horizontally symmetrical with regard to the axis of the upper tube 9 in a top view. For example, the upper bracket 12 is made of an exploded plate 17 (see FIG. 8) of a single sheet metal, which is explained later. The main part 15 and the two extended pieces 16 are formed integrally.

The main part 15 has a section of a bent shape, and includes a connecting part 18 that is shaped to be fit to the outer circumference of the upper tube 9 and is welded thereto to be fixed, and a pair of mounting seats 19 that are extended on the left/right of the connecting part 18, respectively. Each mounting seat 19 includes a flat, tabular part.

The extended pieces 16 function as impact absorbing members that deform to absorb impact energy. The two extended pieces 16 are arranged on the left/right in a row, identical in shape, and formed on the rear edge of the corresponding mounting seats 19 of the main part 15, respectively. Each extended piece 16 includes a base end 20 continuous with the rear edge of the corresponding mounting seat 19 of the main part 15, and an extension end 21 that is superimposed on the main part 15 by bending back the extended piece 16. The extended piece 16 has a first part 22 including the base end 20, a second part 23 including the extension end 21, and a bent part 24 which is formed to be a curved shape between the first part 22 and the second part 23.

The first part 22 extends in the backward axial direction S2, which is reverse to the direction of movement of the upper tube 9, while the second part 23 extends in the forward axial direction S1, which is the direction of movement of the upper tube 9. The bent part 24 is bent around a bending center line B1, which extends to cross the axial directions S1 and S2, for example, to be perpendicular to the directions S1 and S2.

Figure 3:
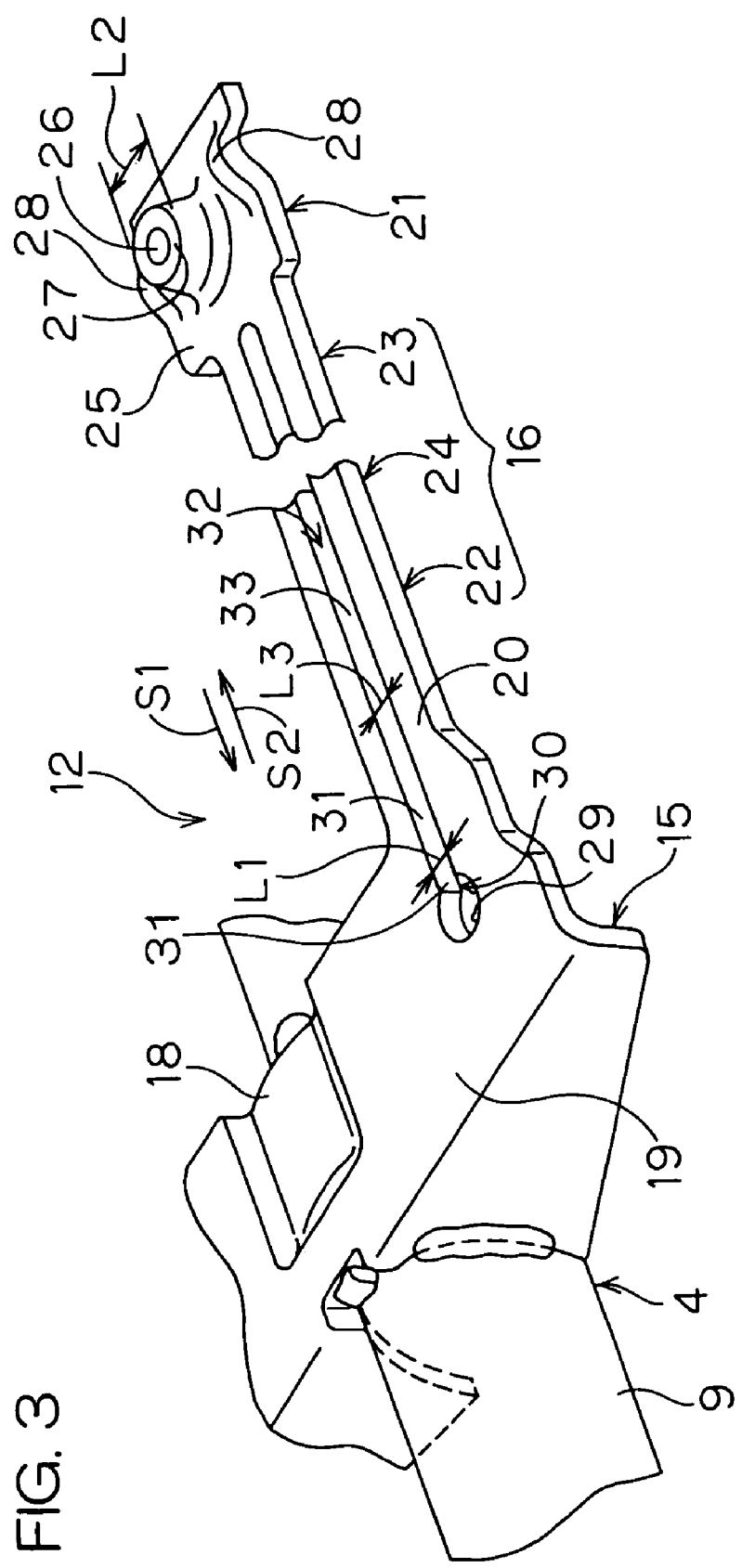
FIG. 3 is a perspective view of the upper bracket shown in FIG. 2, whose bent part is stretched.

FIG. 3 is the perspective view of the upper bracket 12, whose each bent part 24 is stretched straight. The extension end 21 of each extended piece 16 includes a tabular part 25, an insertion hole 26 through which the fixing member 13 is inserted, a cylindrical projection 27, which is formed around the insertion hole 26 and projects from the tabular part 25 to the bending side of the bent part 24, and at least one elastic projection, for example, two elastic projections 28, which are formed near the insertion hole 26 and function as an engaging part that engages with an engaged part (not shown) formed on the mounting seat 19. The cylindrical projection 27 is formed by a burring process. Each elastic projection 28 projects from the tabular part 25 in the same direction as the cylindrical projection 27, and works as a flat spring for supporting both sides of the tabular part to be capable of applying a spring force.

Each mounting seat 19 of the main part 15 has an insertion hole 29, into which the corresponding fixing member 13 and the cylindrical projection 27 are inserted. The insertion hole 29 includes an open part 30 that allows the fixing member 13 to come out of the insertion hole 29 upon collision of a vehicle. The open part 30 is formed on the back side of the insertion hole 29. The open part 30 is disposed apart from the center of the insertion hole 29 in the backward axial direction S2, which is reverse to the direction of movement of the upper tube 9. The open part 30 includes a narrow part 31, which is narrower than the cylindrical projection 27, in the entire area of the open part 30. The width L1 (lateral dimension) of the narrow part 31 is made smaller than the outer diameter L2 (lateral dimension) of the front end of the cylindrical projection 27, which passes through the open part 30 at the time of collision.

The extended piece 16, specifically, the first part 22, the bent part 24, and the second part 23, includes a guide groove 32, which communicates with the insertion hole 29 of the main part 15 via the open part 30, extends in the backward axial direction S2 reverse to the direction of movement of the upper tube 9, and guides a bend deformation of the extended piece 16 upon collision. The guide groove 32 includes a groove that passes through the extended piece 16 in the direction of thickness of the extended piece 16. The guide groove 32 includes a narrow part 33, which is narrower than the cylindrical projection 27, in the entire area of the guide groove 32. The width L3 (lateral dimension) of the narrow part 33 is made smaller than the outer diameter L2 of the front end of the cylindrical projection 27.

Figure 4:
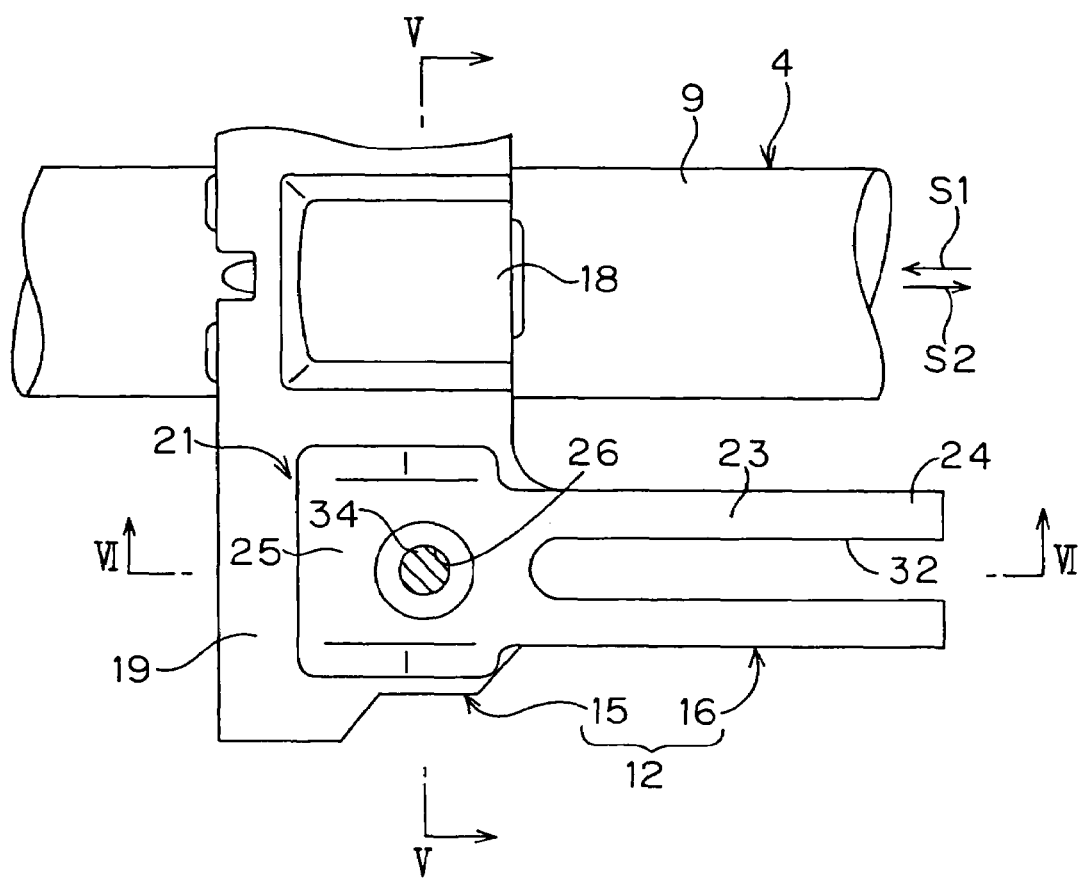
FIG. 4 is a partial sectional top view of the upper bracket or the like shown in FIG. 2.
Figure 5:
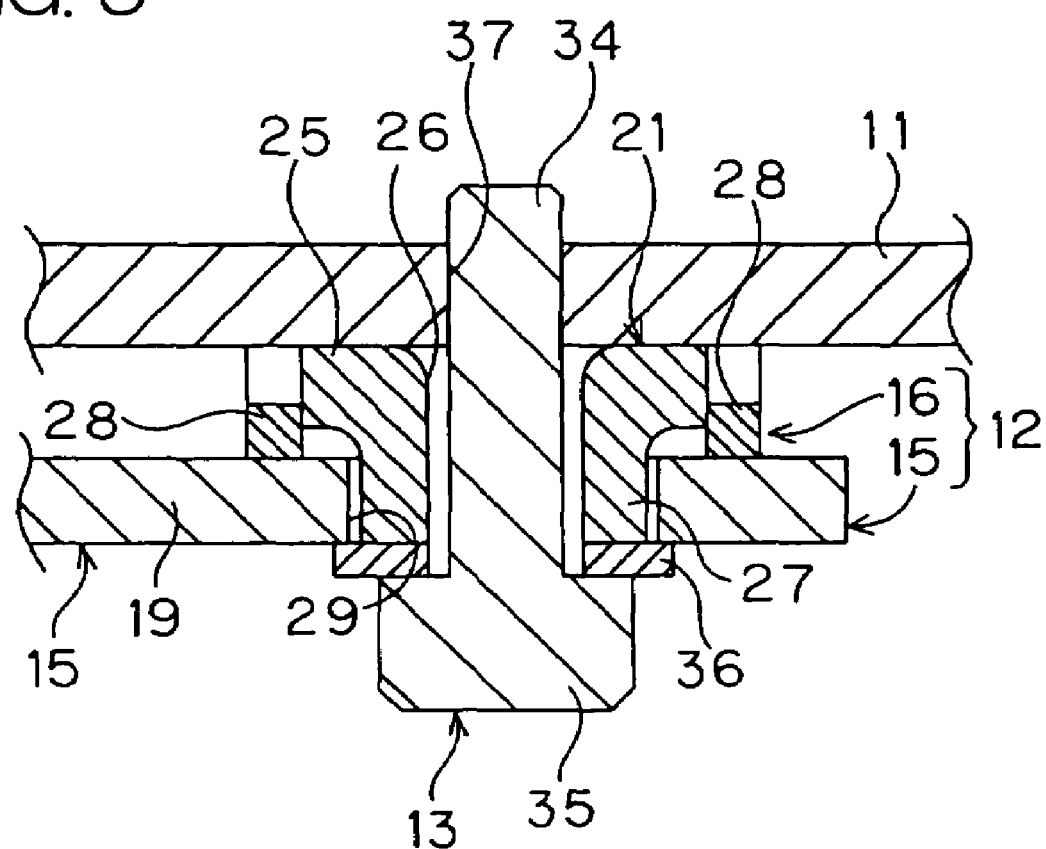
FIG. 5 is a sectional view that depicts the lateral profile along a V-V line of the upper bracket or the like shown in FIG. 4.
Figure 7A:
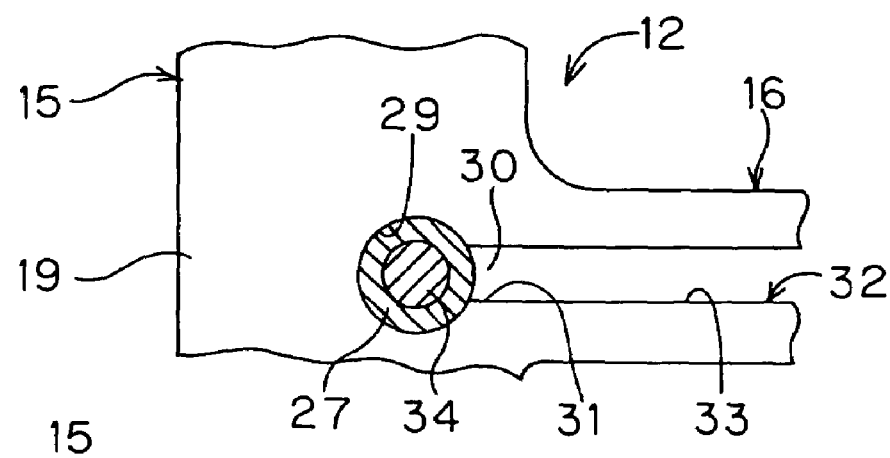
FIGS. 7A and 7B are partial sectional top views of the upper bracket or the like shown in FIG. 2, where
Figure 7B:
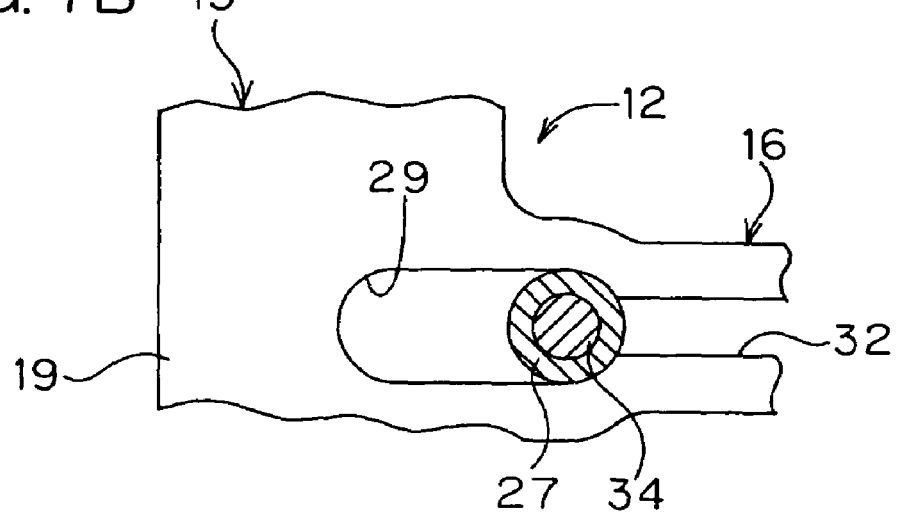

As shown in FIG. 4 and FIG. 5, the extended piece 16 is folded back to superimpose the extension end 21 on the mounting seat 19 of the main part 15, where the cylindrical projection 27 of the extension end 21 is inserted through the insertion hole 29 of the main part 15 to make the insertion hole 26 of the extension end 21 communicate with the insertion hole 29 of the main part 15.

The fixing member 13 is, for example, a bolt, and has a shank 34, on which a male screw is formed, and a head 35 with a large diameter, which is formed on an end of the shank 34 which penetrates a washer 36 in contact with the head 35.

The head 35 of the fixing member 13 is arranged on the under surface side of the main part 15, while the shank 34 of the fixing member 13 penetrates the insertion hole 29 of the main part 15 and the insertion hole 26 of the extension end 21 as well. The penetrating shank 34 is screwed into a female threaded screw hole 37 formed on the vehicle body member 11 by engaging the male screw on the front end of the shank 34 with the female threaded screw hole 37 to fix the shank 34. Thus, the fixing member 13 fixes the extension end 21 of the extended piece 16 of the upper bracket 12 to the vehicle body member 11.

As shown in FIG. 5, in a fixed state, the cylindrical projection 27 of the extension end 21 is held between the head 35 of the fixing member 13 and the vehicle body member 11 via the washer 36. The mounting seat 19 of the main part 15 is also held between the head 35 and the vehicle body member 11 via the extension end 21.

In this structure, a gap of a given size is formed between the mounting seat 19 and the tabular part 25, where the elastic projections 28 deform elastically. The extent of elastic deformation of the elastic projections 28 is limited to a given range by regulating a gap between the head 35 of the fixing member 13 and the tabular part 25 of the extension end 21. As a result, the mounting seat 19 is kept pressed by the elastic projections 28 to engage frictionally with the elastic projections 28 and with the head 35 of the fixing member 13 via the washer 36, and thereby held by a given force. The narrow part 31 of the open part 30 of the insertion hole 29 prevents the cylindrical projection 27 and the fixing member 13 from coming out of the insertion hole 29.

As shown in FIGS. 6A and 6B, the extension end 21 of the upper bracket 12 and the fixing member 13 hold the upper tube 9 on the vehicle body member 11 with a given force via the mounting seat 19 of the main part 15 of the upper bracket 12 in a so-called one-way capsule structure. In this structure, the movement of the upper tube 9 relative to the vehicle body member 11 is restricted at normal time (see FIG. 6A), and is allowed at the time of collision (see FIG. 6B).

Meanwhile, the lower bracket 14 (see FIG. 1) serves to lock the lower tube 10 on the vehicle body 6 to restrict the movement of the lower tube 10 in the axial direction S1 at normal time and times of collision as well.

Figure 1B:
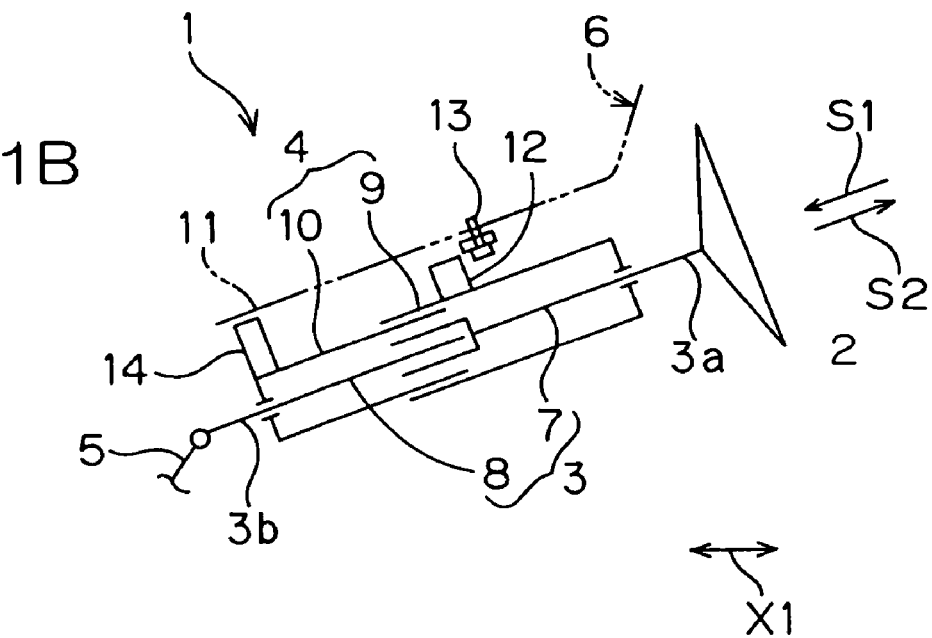

At the time of collision, as indicated in FIG. 1B and FIGS. 6A and 6B, the impact caused by the driver hitting against the steering wheel 2 is transmitted from the steering wheel 2 to the upper tube 9. When the size of the impact surpasses that of a holding force on the mounting seat 19, the mounting seat 19 comes out of the held position between the head 35 of the fixing member 13 and the tabular part 25 of the extension end 21, and the upper tube 9 moves relative to the vehicle body 6 and to the lower tube 10, that is, moves forward, together with the steering wheel 2 and the upper shaft 7.

At this time, as shown in FIGS. 6A, 6B and 7A, 7B, the main part 15 of the upper bracket 12 and the base end 20 of the extended piece 16 move along with the upper tube 9 of the steering column 4 while resisting a tensile force of the extended piece 16 in the axial directions S1 and S2. This movement of the main part 15 and the base end 20 results in a relative movement between the base end 20 and the extension end 21 of the extended piece 16, which causes the extended piece to deform. For example, the extended piece 16 bends as the bent part 24 of the extended piece 16 shifts to approach the extension end 21. At this time, the cylindrical projection 27 rubs itself against the narrow part 31 of the open part 30 and against the narrow part 33 of the guide groove 32, and widens both narrow parts. Meanwhile, the head 35 of the fixing member 13 gives the mounting seat 19 friction resistance via the washer 36, while the elastic projections 28 press the mounting seat 19 with the applying energy to also provide the mounting seat 19 with friction resistance. The widening of the narrow parts and the given friction resistance absorb the impact energy.

As shown in FIG. 2, according to this embodiment, as described above, the impact energy is absorbed. In addition, the main part 15, which is fixed to the upper tube 9 of the steering column 4, and the extension end 21 of the extended pieces 16, which is fixed to the vehicle body member 11, are formed integrally into a single component, so that the number of components can be reduced to lessen trouble in the mounting work. Moreover, the upper bracket 12 is made of a single sheet metal, for example, the exploded plate 17 (see FIG. 8), to make the manufacturing cost of the upper bracket 12 inexpensive.

At the time of collision, according to the embodiment, the extended piece 16, which extends in the axial directions S1 and S2, bends as the bent part 24 of the extended piece 16 shifts, while the cylindrical projection 27 widens at least either of the narrow part 33 or 31, which are formed at least on the first part 22 of the guide groove 32 or on a part of the open part 30, respectively, to absorb the impact. The steering apparatus 1, therefore, which can absorb the impact, can suppress an increase in the number of components, using the cylindrical projection 27 and the extended piece 16, which are formed integrally on the upper bracket 12.

It is desirable for the absorption of the impact energy that the bent part 24 of the extended piece 16, more desirably, the second part 23 as well, have the guide groove 32, because the guide groove 32 guides the shift of the bent part 24 of the extended piece 16 in a secure manner.

At least a part of, or, more desirably, the entire part of the one-way capsule structure, in which the mounting seat 19 of the upper bracket 12 is held to be movable relative to the vehicle body member 11, is formed integrally with the mounting seat 19. That is, at least one of, or, more desirably, all of the tabular part 25 of the extension end 21, which is at least one of a pair of holding pieces coupled to each other, the cylindrical projection 27, which is a regulating portion for regulating a gap between the holding pieces, and the elastic projections 28, which is the engaging part that engages with the engaged part of the mounting seat 19 to provide the holding force, are formed integrally with the mounting seat 19. This contributes to a further reduction in the number of components, and enables simplification of the structures of the vehicle body member 11 and of the fixing member 13.

By adjusting the size of at least any one of the extended piece 16, the cylindrical projection 27, the elastic projections 28, the open part 30, the guide groove 32, etc., impact absorption characteristics, such as an impact energy absorption quantity, the size of an impact absorption load against the movement of the upper tube 9 upon absorbing the impact, and a change in the impact absorption load in response to the amount of movement of the upper tube 9, are adjusted properly.

As shown in FIG. 8, the upper bracket 12 is made of a sheet metal molded by press working. The upper bracket 12 is formed by shaping, for example, an intermediate product including the exploded plate 17, which is a single sheet metal having an exploded shape described below.

The exploded plate 17 has a first part 38, which extends in one direction to form the main part 15, two second parts 39, which form respective first parts 22 of the two extended pieces 16, two third parts 40, which form respective bent parts 24 of the two extended pieces 16, and two fourth parts 41, which form respective second parts 23 and tabular parts 25 of the two extended pieces 16.

The second parts 39 are connected to one and the other ends of one longitudinal edge 38a of the first part 38, respectively. Each second part 39 extends in the same direction, which is perpendicular to the longitudinal direction of the first part 38, from the corresponding end of the edge 38a. Respective pairs of second, third, and fourth parts 39, 40 and 41, which compose two extended pieces 16 in correspondence, are formed consecutively and linearly in an increasing order along the extension direction of the second parts 39. Respective pairs of the second, third, and fourth parts 39, 40, and 41 extend parallel to each other.

A virtual bending preparation line 43 is formed on the first part 38 to extend in its longitudinal direction. Bending the first part 38 along the bending preparation line 43 gives the approximate shape of the main part 15 of the upper bracket 12. Also, virtual bending preparation lines 44 (equivalent to the bending center lines B1) are formed in the middle of the extension of the third parts 40, respectively, to be parallel with the longitudinal direction of the first part 38. Bending back the fourth parts 41 along the bending preparation lines 44 gives the approximate shape of the extended pieces 16.

The groove 32 passes through the extended piece 16, but this is not limited. As shown in FIGS. 9A and 9B, a groove 32A having a bottom 321 in the direction of thickness of the extended piece 16 may be provided for at least part of the guide groove 32. The extended piece 16 has a thin portion 161 adjacent to the bottom 321 of the guide groove 32A. The guide groove 32A has, for example, a V-shaped cross section. During the vehicle collision, as the thin portion 161 is torn, the guide groove 32A is widened to absorb the shock.

Now the second embodiment of the invention is described. The following description will focus on differences from the first embodiment, and an explanation of constitutions common in both embodiments will be omitted. The same symbols are given to the elements that correspond to that in the first embodiment. Modifications that will be explained later are handled in the same manner.

Figure 10:
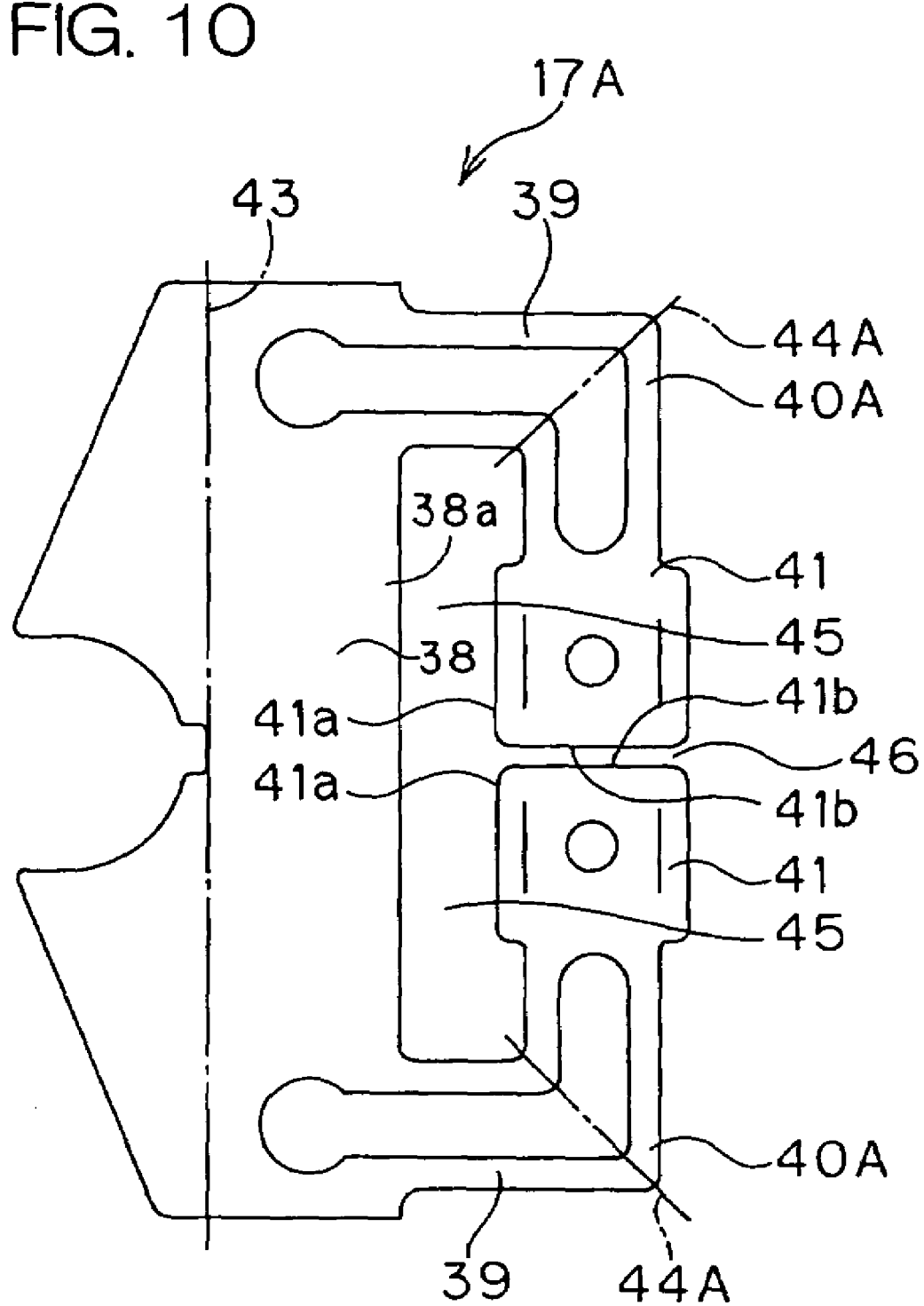
FIG. 10 is a top view of the exploded plate corresponding to an upper bracket according to a second embodiment of the invention.

As shown in FIG. 10, an upper bracket (not shown) according to the second embodiment is made by bending an exploded plate 17A, whose shape is different from that of the exploded plate 17 of the first embodiment.

The exploded plate 17A includes third parts 40A, which extend in a bent shape provided as substitute for the third parts 40. On the exploded plate 17A, two third parts 40A are bent opposite to each other so that two fourth parts 41 approach each other. Respective fourth parts 41 extend opposite to each other from the corresponding extension ends of the third parts 40A along the longitudinal direction of the first part 38. The fourth parts 41 have edges 41a, which are formed to be close to the corresponding edge 38a of the first part 38 to form a cutout slot 45 between the edges 41a and the edge 38a, and extend parallel with the edge 38a. The two fourth parts 41 have respective edges 41b, which are close and opposite to each other to form a cutout slot 46 therebetween, and extend parallel to each other. The second parts 39 and the fourth parts 41 extend in respective directions that cross each other.

Virtual bending preparation lines 44A are formed on the third parts 40A to extend diagonally in the longitudinal direction of the first part 38, respectively. The bending preparation lines 44A extend in a direction that diagonally crosses the axial directions S1 and S2, in which the upper tube moves. Bending back the fourth parts 41 along the bending preparation lines 44A as the bending center lines gives the approximate shape of the extended pieces.

The second embodiment is different from the first embodiment in the aspect of the exploded shape of the extended pieces, but is identical in other aspects. The second embodiment, therefore, provides the same effects as the first embodiment.

The exploded plate 17A includes a plurality of parts which extend in respective directions crossing each other to form each extended piece, that is, for example, the second part 39 and the fourth part 41. This structure of the exploded plate 17A makes it possible to produce more exploded plates 17A for the upper brackets from a sheet material per unit area. The exploded plate 17A is, therefore, desirable for reducing the manufacturing cost of the upper bracket.

Figure 11:
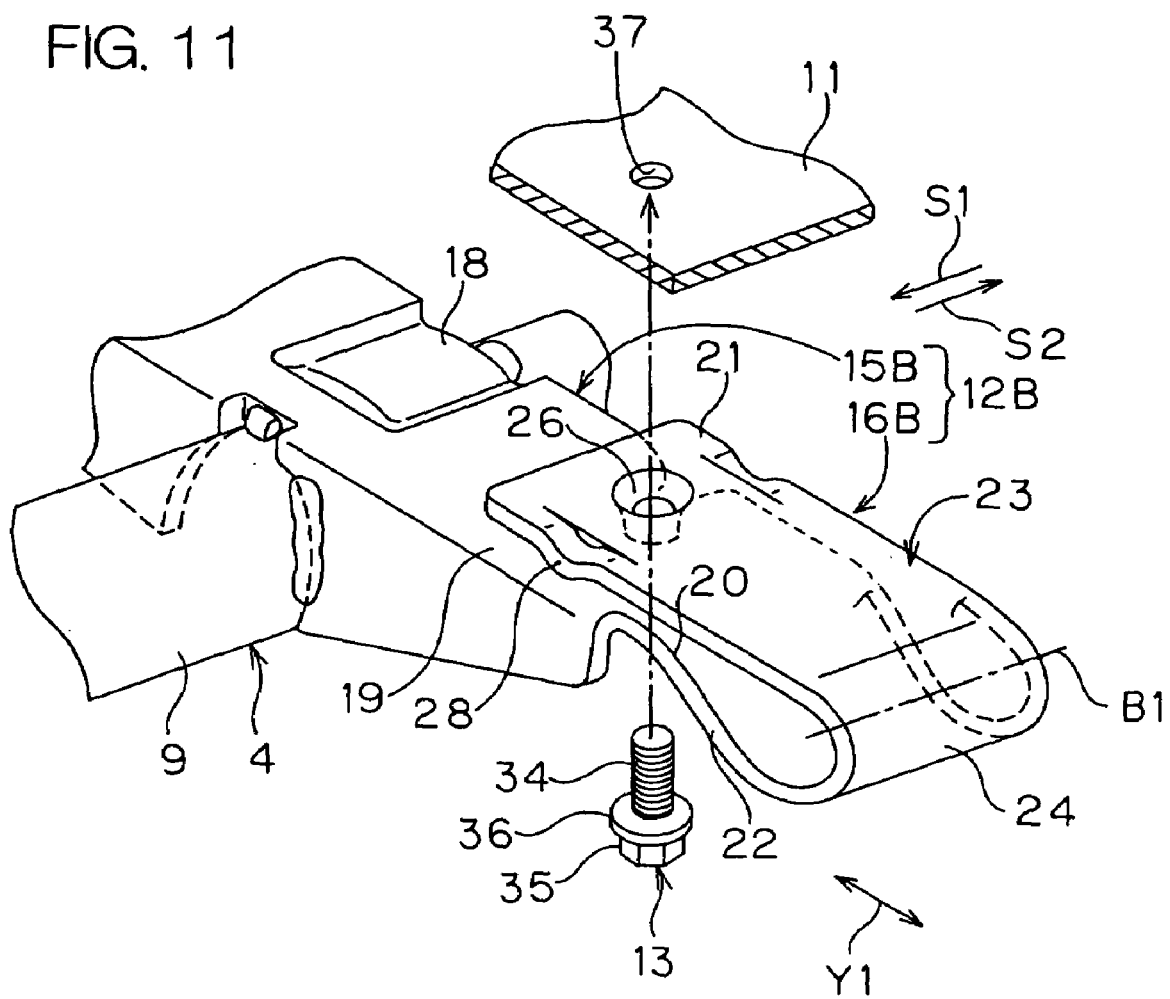
FIG. 11 is an exploded perspective view of an upper bracket or the like according to a third embodiment of the invention.

FIG. 11 shows an upper bracket 12B according to the third embodiment, which has a main part 15B and an extended piece 16B.

Figure 12:
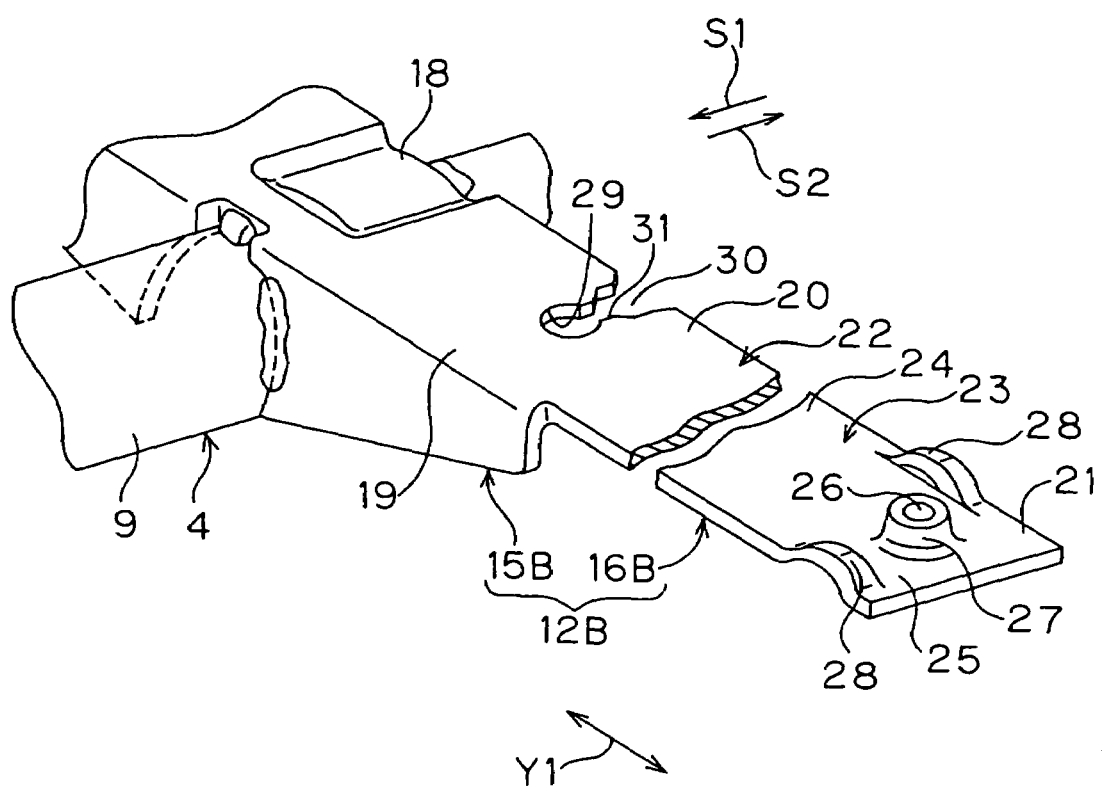
FIG. 12 is a perspective view of the upper bracket shown in FIG. 11, whose bent part is stretched.

As shown in FIG. 12, on the main part 15B, the insertion hole 29 is open to the outside via the open part 30, whose narrow part 31 is formed on a part of the open part 30 adjacent to the insertion hole 29. This is the difference between the main part 15B and the main part 15 of the first embodiment.

As shown in FIGS. 11 and 13, the extended piece 16B includes the base end 20 continuous with the left/right side edges of the mounting seat 19 of the main part 15B. On the extended piece 16B, the first part 22 and the second part 23 extend in a direction that crosses the axial directions S1 and S2 in which the upper tube 9 moves, that is, for example, perpendicular to the axial directions S1 and S2, or in the lateral direction Y1 of the vehicle. The bending center line B1 of the bending part 24 extends parallel with the axial directions S1 and S2. In addition, the extended piece 16B has no guide groove 32 that is provided for the extended piece of the first embodiment. These structural elements make the extended piece 16B different from the extended piece 16 of the first embodiment.

Figure 14A:
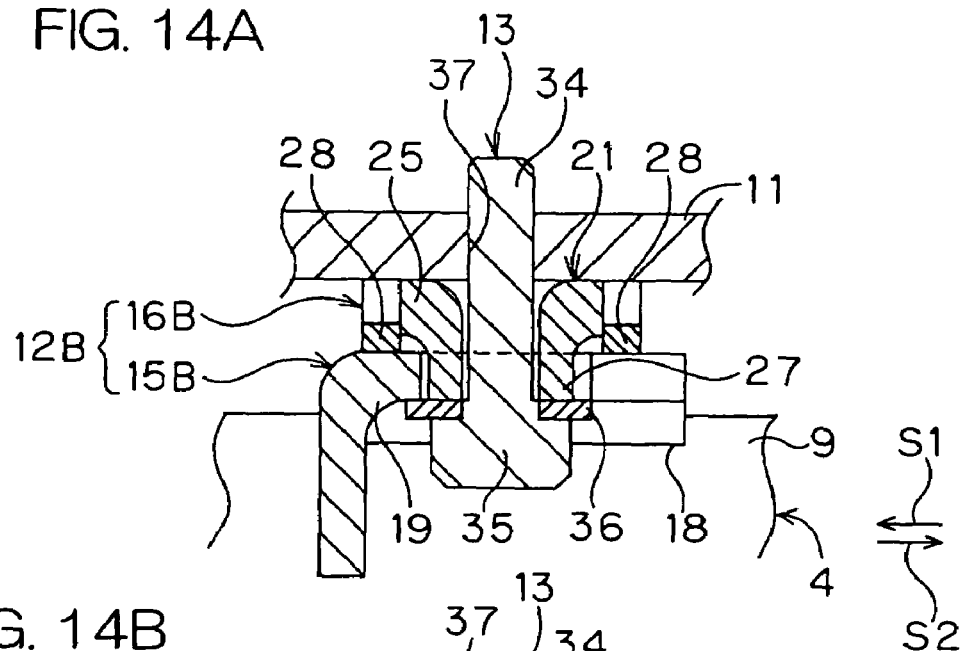
FIGS. 14A and 14B are partial sectional side views that depict the profile along a XIV-XIV line of the upper bracket or the like shown in FIG. 13, where

As shown in FIGS. 14A and 15A, the mounting seat 19 of the main part 15B is held by a given force between the tabular part 25 of the extension end 21 of the extended piece 16B on the upper bracket 12B and the head 35 of the fixing member 13 via the washer 36 at normal times. The narrow part 31 prevents the cylindrical projection 27 from coming out of the insertion hole 29.

Figure 14B:
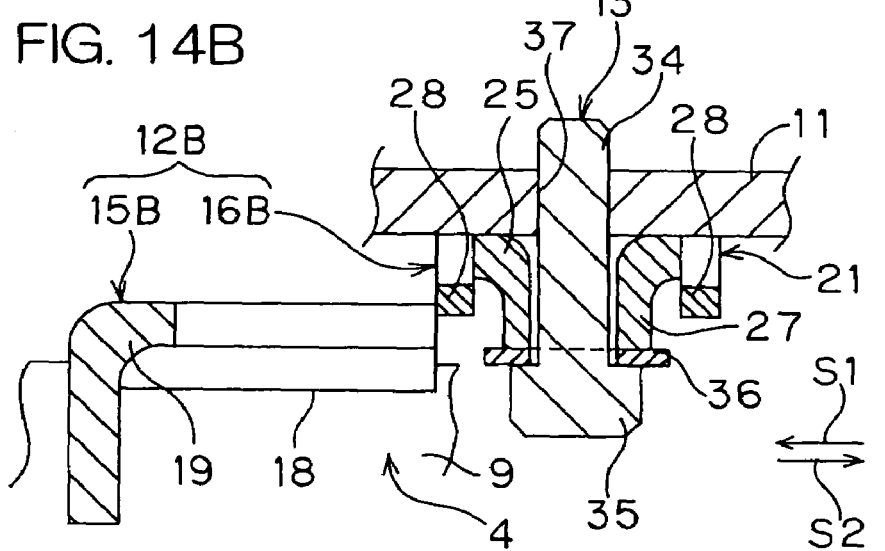

As shown in FIGS. 14B and 15B, when the size of impact upon collision surpasses that of the holding force, the cylindrical projection 27 presses and widens the narrow part 31 of the open part 30, which allows the mounting seat 19 to move relative to the extension end 21. Then, the mounting seat 19 comes off the held position between the head 35 of the fixing member 13 and the tabular part 25 of the extension end 21 to move forward, which separates the elastic projections 28 and the head 35 from the mounting seat 19 to release the engagement for holding the mounting seat 19. The main part 15B of the upper bracket 12B and the base end 20 of the extended piece 16B move along with the upper tube 9 of the steering column 4. At this time, the base end 20 and the extension end 21 of the extended piece 16B move relative to each other, which results in a deformation of the extended piece 16B. Specifically, the extended piece 16B is twisted between the base end 20 and the extension end 21 to bend. Meanwhile, the cylindrical projection 27 widens the narrow part 31 of the open part 30 to give frictional resistance. Thereby, the impact energy is absorbed.

According to this embodiment, the impact energy is absorbed by the collapsible steering apparatus 1. In addition, the main part 15B of the upper bracket 12B and the extension end 21 of the extended pieces 16B are formed integrally into a single component, so that the number of components can be reduced to lessen the trouble in the mounting work. Moreover, the upper bracket 12B is made of the exploded plate 17B (see FIG. 16) as a single sheet metal to make the manufacturing cost of the upper bracket 12B inexpensive.

At the time of collision, the extended piece 16B is twisted between the base end 20 and the extension end 21 to absorb the impact. That is, the extended piece 16B formed integrally with the upper bracket 12B is used to absorb the impact to suppress an increase in the number of components.

Moreover, impact absorption characteristics are adjusted properly by adjusting the size of any one of the extended piece 16B, the cylindrical projection 27, the elastic projections 28, the open part 30, etc.

Figure 16:
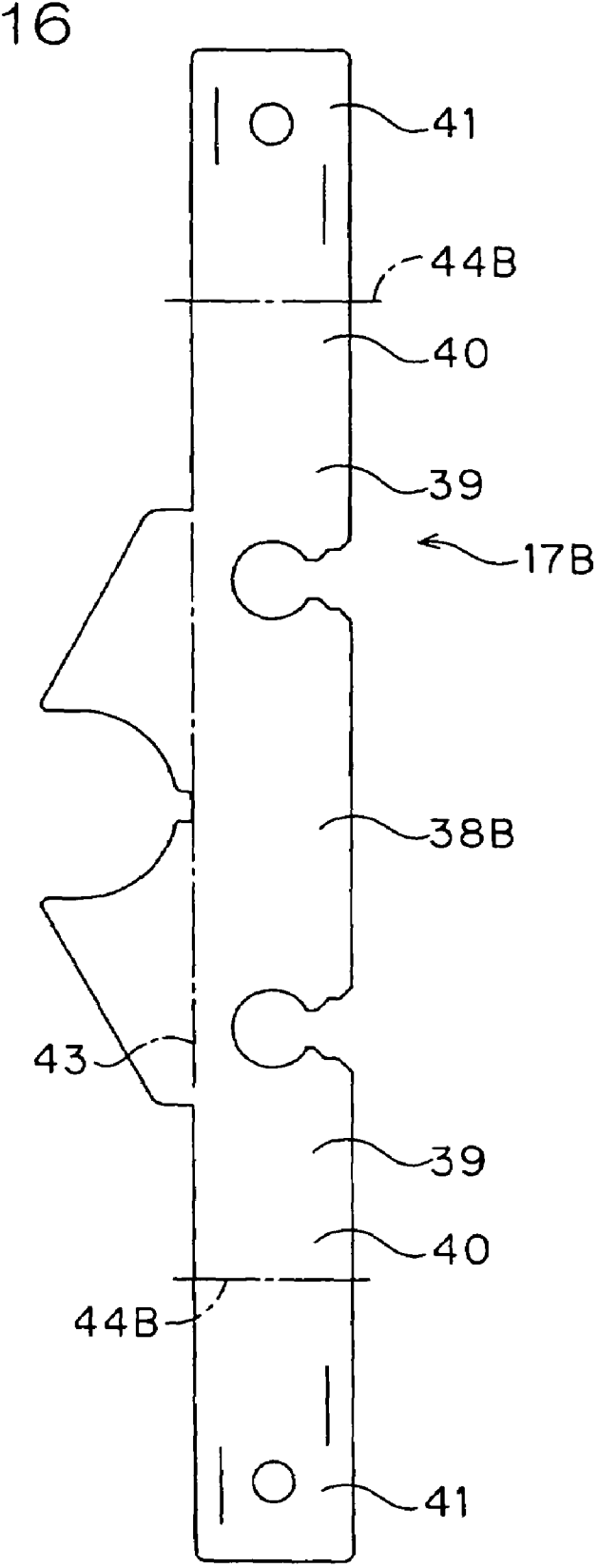
FIG. 16 is a top view of the exploded plate corresponding to the upper bracket shown in FIG. 11.

The upper bracket 12B is given by shaping, for example, an intermediate product consisting of the exploded plate 17B as shown in FIG. 16, which is a single sheet metal having an exploded shape described below.

The exploded plate 17B has a first part 38B, which extends in one direction to form the main part 15B, two second parts 39, which form respective first parts 22 of the two extended pieces 16B, two third parts 40, which form respective bent parts 24 of the two extended pieces 16B, and two fourth parts 41, which form respective second parts 23 of the two extended pieces 16B.

The two second parts 39 extend opposite to each other in the longitudinal direction of the first part 38B, from respective edges of the first part 38B, which are at both longitudinal ends of the first part 38B and extend in its lateral direction. From the extension end of each second part 39, each corresponding third part 40 extends. From the extension end of each third part 40, each corresponding fourth part 41 extends. The second, third, fourth parts 39, 40, and 41 are formed consecutively and linearly to extend in the longitudinal direction of the first part 38B. In the middle of the extension of the third parts 40, virtual folding preparation lines 44B (equivalent to the bending center lines B1) are formed perpendicular to the longitudinal direction of the first part 38B, respectively. Bending back the fourth parts 41 along the bending preparation lines 44B as the bending center lines gives the approximate shape of extended pieces 16B.

Figure 17:
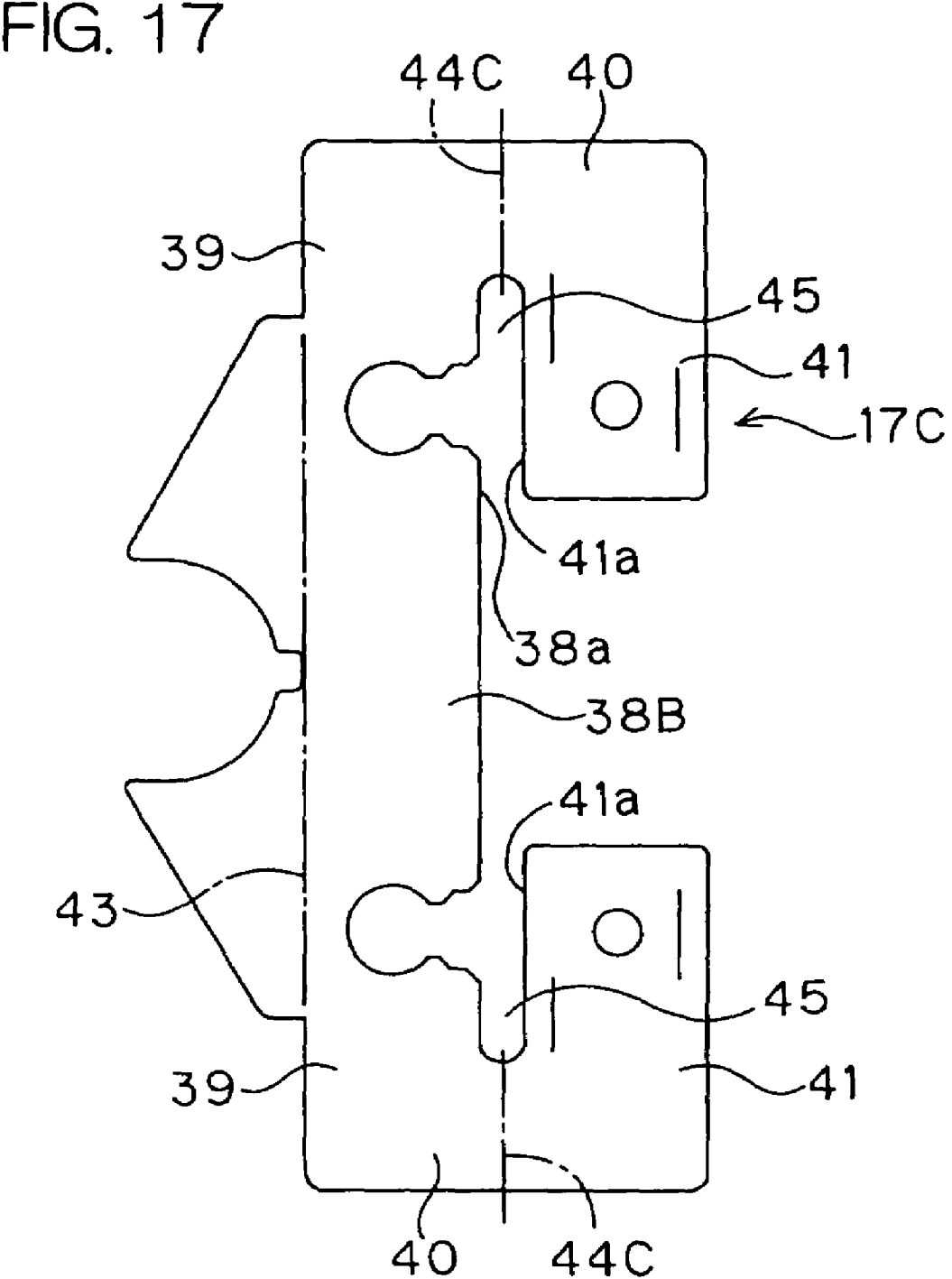
FIG. 17 is a top view of the exploded plate corresponding to an upper bracket according to a fourth embodiment of the invention.

As shown in FIG. 17, an upper bracket (not shown) according to the fourth embodiment is made by bending an exploded plate 17C, whose shape is different from that of the exploded plate 17B of the third embodiment.

On the exploded plate 17C, two third parts 40 extend from respective extension ends of the second parts 39 in a direction that crosses, for example, perpendicular to the extension direction of the second parts 39. Two third parts 40 extend in the same direction that is perpendicular to the longitudinal direction of a first part 38B. Two fourth parts 41 extend opposite to each other from the corresponding extension ends of the third parts 40, in a direction that crosses, for example, perpendicular to the extension direction of the third parts 40 and is the longitudinal direction of the first part 38B. The fourth parts 41 have respective edges 41a, which are formed to be close to the corresponding edge 38a of the first part 38B to form cutout slots 45 between the edges 41a and the edge 38a, and extend parallel with the edge 38a.

Virtual bending preparation lines 44C are formed on the third parts 40 to extend parallel with the longitudinal direction of the first part 38B, respectively. The bending preparation lines 44C extend perpendicular to the axial directions S1 and S2, in which the upper tube moves. Bending back the fourth parts 41 along the bending preparation lines 44C as the bending center lines gives the approximate shape of the extended pieces.

The fourth embodiment is different from the third embodiment in the aspect of the exploded shape of the extended pieces, but is identical in other aspects. The fourth embodiment, therefore, provides the same effects as the third embodiment.

In addition, the exploded plate 17C includes a plurality of parts which extend in respective directions crossing each other to form each extended piece, that is, for example, the second part 39, the third part 40, and the fourth part 41. This structure of the exploded plate 17C makes it possible to produce more exploded plates 17C for the upper brackets from a sheet material per unit area, as in the case of the exploded plate 17A of the second embodiment. The exploded plate 17C is, therefore, desirable to reduce the manufacturing cost of the upper bracket.

As regards the embodiments of the invention, it is considered that the invention is not limited to the respective embodiments described so far, but the following modifications are possible. For example, while the open part 30 and the guide groove 32 include the narrow parts 31 and 33, respectively, according to the first embodiment, it is not the only case. For example, at least a part of at least either of the open part 30 or the guide groove 32 may be formed to be wider than the cylindrical projection 27. This modification is also applicable to the second embodiment. In another modification, at least either of the guide groove 32 or the open part 30 according to the first embodiment may be included in the constitution of the apparatus according to the third and fourth embodiments. Moreover, the elimination of the guide groove 32 is also possible.

Also, while the tabular part 25 of the extension end 21 and the cylindrical projection 27 are formed integrally according to the above embodiments, both parts may be formed separately.

Likewise, the elastic projections 28, which are formed on the extension end 21 according to the above embodiments, may be formed, for example, on the mounting seat 19 of the main part 15. The engagement of the elastic projections 28 with engaging recessions as the corresponding engaged part, or the elimination of the elastic projections 28 is also possible.

According to the above embodiments, the steering apparatus is provided with two extended pieces corresponding to each other, but a single, or three or more extended pieces can be formed on the apparatus as another modification. Providing at least one extended piece ensures the effect of the invention. In the first embodiment, each extended piece 16 may be formed to extend diagonally in the direction of movement of the upper tube 9, and this modification is also applicable to the other embodiments described so far.

While the mounting seat 19 of the main part 15 of the upper bracket 12 is held between the tabular part 25 of the extension end 21 of the extended piece 16 and the head 35 of the fixing member 13, according to the above embodiments, another arrangement is possible. For example, on the upper bracket 12 according to the first embodiment as shown in FIG. 3, the cylindrical projection 27 and the elastic projections 28 may be formed to project from the tabular part 25 in the reverse direction. The bent part 24 of the extended piece 16 may be therefore, folded back also in reverse to set the extension end 21 counter to the under surface of the mounting seat 19. Then, the mounting seat 19 is held between the tabular part 25 of the extension end 21 and the vehicle body member 11, where the extension end 21 is fixed to the vehicle body member 11 by means of the fixing member 13. This modification is also applicable to the second to fourth embodiments.

The fixing member 13 consists of a bolt and is screwed down to be engaged with the female screw formed on the vehicle body member 11, according to the above embodiments, but this is not limited. As another arrangement, the bolt as the fixing member 13 may be inserted into an insertion hole on the vehicle body member 11 and fixed with a nut. A stud bolt fixed to the vehicle body member 11 and a nut or rivet screwed on the stud bolt may be used as another form of the fixing member 13.

The upper tube 9 is described as the movable part of the steering column in the above embodiments, but this is not limited. The movable part may be such a bracket that is formed on the steering column for adjusting the position of the steering wheel to be capable, or incapable of relative movement.

In a case where the whole of the steering column 4 moves relative to the vehicle body member 11 at the time of collision, the whole of the steering column 4 works as the movable part. In this case, the lower bracket 14 is given the same structure as the upper bracket according to the above embodiments to allow the steering column 4 to move forward upon collision.

In a case where the upper tube 9 and the lower tube 10 can move relatively at the time of collision, the lower bracket 14 may be given the same structure as the upper bracket according to the above embodiments to allow the lower tube 10 to move backward to absorb the impact of a first collision when receiving a front-end impact force.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

This patent application corresponds to Japanese Patent Application 2004-158262, which was filed with the Japan Patent Office on May 27, 2004. The whole disclosure of Japanese Patent Application 2004-158262 is incorporated herein by reference.

The invention claimed is:

1. A collapsible steering apparatus comprising;
a steering column that includes a movable part capable of moving upon collision of a vehicle;
a bracket that is made of a single sheet metal and is fixed to the movable part of the steering column; and
a fixing member for fixing the movable part of the steering column to a vehicle body member via the bracket; wherein
the bracket includes a main part, and an extended piece which is extended from the main part and is folded back into a U shape,
the extended piece includes a base end connected to the main part, and an extension end superimposed on the main part by the folding,
the main part and the extension end of the extended piece include respective insertion holes communicating with each other,
the fixing member is inserted through each insertion hole of the main part and of the extension end of the extended piece, and is adapted to be fixed to the vehicle body member to fix the extension end to the vehicle body member,
the insertion hole of the main part includes an open part, which is adapted to allow the fixing member to come out of the insertion hole of the main part upon the collision, and
upon the collision as the main part of the bracket and the base end of the extended piece are adapted to move along with the movable part of the steering column, the base end and the extension end of the extended piece are adapted to move relative to each other to deform the extended piece to absorb a shock of the collision.

2. The collapsible steering apparatus according to claim 1, wherein the extended piece has a first part including the base end, a second part including the extension end, and a bent part formed between the first part and the second part.

3. The collapsible steering apparatus according to claim 2, wherein the first part extends in a direction opposite to a direction of movement of the movable part, and
the second part extends in the direction of movement of the movable part.

4. The collapsible steering apparatus according to claim 3, wherein at least the first part of the extended piece includes a guide groove for guiding a bend deformation of the extended piece caused by the collision.

5. The collapsible steering apparatus according to claim 4, wherein the guide groove communicates with the insertion hole of the main part via the open part, and extends in reverse to the direction of movement of the movable part.

6. The collapsible steering apparatus according to claim 5, wherein the extension end includes a cylindrical projection, which is formed around the insertion hole of the extension end and is inserted into the insertion hole of the main part.

7. The collapsible steering apparatus according to claim 6, wherein
at least either of the open part or the guide groove includes a portion having a width smaller than the outer diameter of the cylindrical projection, and
upon the collision, the cylindrical projection widens the portion as the bent part of the extended piece shifts to deform the extended piece to absorb the shock of the collision.

8. The collapsible steering apparatus according to claim 4, wherein the guide groove includes a groove that passes through the extended piece in a direction of thickness of the extended piece.

9. The collapsible steering apparatus according to claim 4, wherein
the guide groove includes a groove having a bottom in a thickness direction of the extended piece,
the extended piece includes a portion adjacent to the bottom of the groove, and
the portion is adapted to be torn to absorb the shock of the collision.

10. The collapsible steering apparatus according to claim 2, wherein the first and second parts extend in the direction that crosses a direction of movement of the movable part.

11. The collapsible steering apparatus according to claim 10, wherein the extended piece is twisted between the base end and the extension end to absorb the shock of the collision.

12. The collapsible steering apparatus according to claim 1, wherein the sheet metal includes a plate that has a plurality of parts extending in mutually crossing directions.

* * * * *